United States Patent [11] 3,563,230

[72] Inventors Charles B. Gibbs
 Province Ottawa, Canada;
 Gladys A. Gibbs, Executrix of said
 Charles B. Gibbs, deceased.
[21] Appl. No. 728,626
[22] Filed May 13, 1968
[45] Patented Feb. 16, 1971
[32] Priority May 16, 1967
[33] Canada
[31] 990609

[54] APPARATUS FOR TESTING A SUBJECT
 8 Claims, 12 Drawing Figs.
[52] U.S. Cl. .................................................. 128/2,
 35/22, 273/1
[51] Int. Cl. .................................................. A61b 5/16
[50] Field of Search ........................................ 128/2;
 273/1, 1(e); 35/11, 22

[56] References Cited
 UNITED STATES PATENTS
1,564,138 12/1925 Rowland ..................... 35/22X
1,729,227 9/1929 Reid ........................... 35/22X
1,937,445 11/1933 Smith .......................... 35/22X
1,953,954 4/1934 Constable .................... 35/22X
2,678,692 5/1954 Ranseen ...................... 35/22
2,984,017 5/1961 Pask ........................... 35/22X
 FOREIGN PATENTS
1,140,712 3/1957 France ........................ 128/2

Primary Examiner—Dalton L. Truluck
Assistant Examiner—Kyle L. Howell
Attorney—Johnson, Marcus & Wray ABSTRACT: An apparatus for determining the stress and/or impairment of a test subject by providing a plurality of lamps which are illuminated in sequence, the test subject being required to operate a handle to align a pointer with the lamps as they become illuminated. The responses of the test subject, including his response time, are measured by way of electrical circuits so as to determine particular characteristics of the test subject whereby an indication can be obtained as to his stressed condition or impairment.

Charles B. Gibbs
INVENTOR

Johnson, Marcus R. Wray.
AGENTS

APPARATUS FOR TESTING A SUBJECT

This invention relates to apparatus and a method for measuring the response of a test subject.

Many devices have been provided for determining the response of a test subject to various stimulations which may be of various kinds, such as visual, auditory, smell, taste, feeling, or other sensory stimulations received by the subject from a controlled source of transmission. On the occurrence of a stimulation, a subject will respond and his response may be either rapid or slow, accurate or inaccurate.

Many devices have been constructed to test the responses of a subject and to determine certain characteristics of the subject under, for example, different conditions. In one proposed device, a technique of "serial reaction" is used wherein a plurality of lights are illuminated in turn and the subject responds by touching a cup surrounding the stimulus light. The lights are always illuminated in the same sequence, in time, the subject realized which light would be illuminated next. Thus, the results of the tests obtained using that previously proposed device were not as reliable as one would wish and the device suffered from certain disadvantages.

One known instrument has been constructed to estimate the amount of alcohol that has recently been consumed by a person. This instrument has received wide acclaim but suffers from the disadvantage that the device only determines the amount of alcohol consumed by a person. A given amount of alcohol has very different effects upon the behavior of different individuals and it may well be that, after consuming the same amount of alcohol, two different people may be subjected to different degrees of impairment of their ability to control a vehicle.

From one aspect of the present invention, it is an object to provide an improved apparatus which is capable of use to give a better indication as to the extent to which a test subject is impaired and/or under stress.

According to this aspect of the invention, there is provided an apparatus for determining at least one particular characteristic of a subject including: (a) indicating means capable of assuming any one of a plurality of positions under control of an operating means; (b) said operating means being capable of operation by said subject; (c) means for providing an incompatible relationship between said operating means and said indicating means; (d) means for causing each of a plurality of stimulating events to occur in turn in a specified statistical distribution; (e) each of said positions corresponding to a separate one of said events whereby on occurrence of a particular event, operation of said operating means by the subject will cause the indicating means to move towards or away from the corresponding position; and (f) means for determining at least one response property of said subject whereby said particular characteristic can be determined.

From another aspect of this invention, there is provided an apparatus for testing subjects which is capable of providing a better indication as to the extent to which a test subject is impaired and/or under stress.

Several embodiments of the invention will now be described, by way of example, with reference to the accompanying drawings in which.

Figure 1:
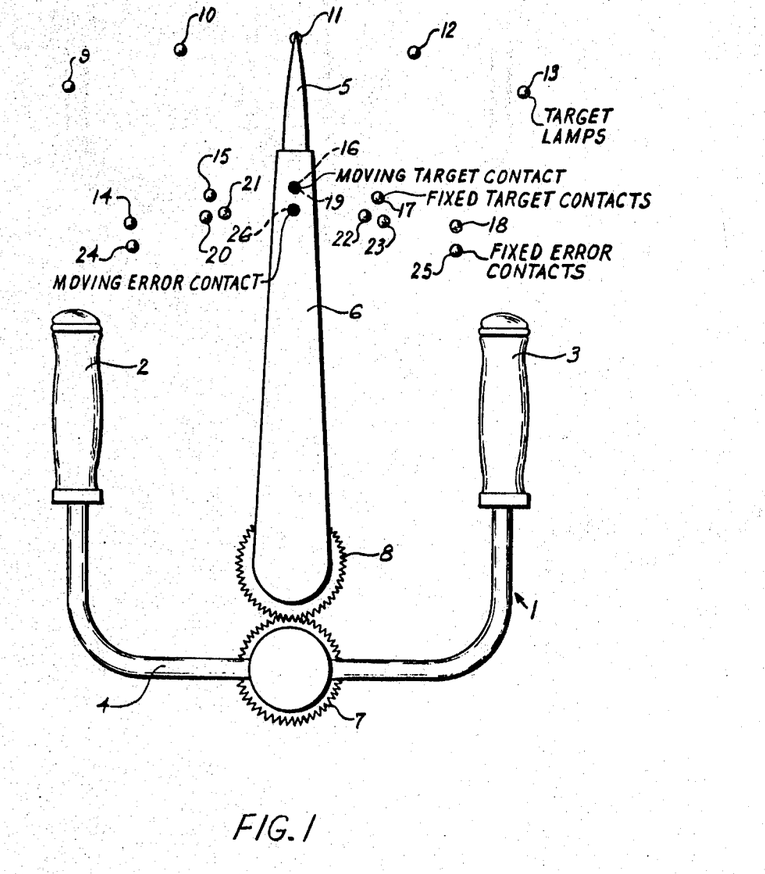
FIG. 1 is a diagrammatic representation of a display arrangement according to one embodiment of the invention as it would appear to a subject under test and showing handle-operating means and pointer-indicating means.

Referring to FIG. 1, it will be seen that the display arrangement includes a handle-operating means 1 having two spaced-apart handle grips 2 and 3 on opposite ends of an operating bar shaped as shown in FIG. 1. A pointer-indicating means is also provided comprising a pointer 5 integrally connected to a pointer-carrying portion 6.

Movement of the handle-operating means 1 is arranged to cause a corresponding movement of the pointer 5 by way of a toothed wheel 7 integrally connected to the operating bar 4 and a second toothed wheel 8 integrally connected to the pointer portion 6. Due to the use of the toothed wheels 7 and 8, movement of the handle-operating means and toothed wheel 7 in one direction, e.g. clockwise, results in movement of the pointer 5 in the opposite direction, e.g. anticlockwise, so that an incompatible relationship is provided between the handle-operating means and the indicating means in the form of the composite pointer 5 and 6 by the toothed gear wheels 7 and 8.

A plurality of small electric lamps 9, 10, 11, 12 and 13 is provided on the display arrangement as seen by a test subject and these may be regarded as target lights which, when illuminated, comprise a stimulating event. By illuminating the lamps in turn, a plurality of stimulating events can be caused to occur in a specified statistical distribution. The statistical distribution or sequence of illumination of the lamps 9 through 13 can be so arranged that the next lamp to be illuminated is not that lamp which is most probable but is an improbable selection. In other words, depending on the initial position of the illuminated target lamp, the direction of the step movement varies in probability. There is no uncertainty of direction in step movements starting from the positions corresponding to electric lamps 9 and 13 at the extremity of the sequence of lamps and, therefore, these stops may be termed "unequivocal." At a position determined by lamp 10, there is a three to one probability that the next lamp to be illuminated is to the right rather than to the left (i.e. lamp 9). Similarly, when lamp 12 is illuminated, then there is more likelihood that the next lamp to be illuminated will be to the left, rather than to the right (to the right being the position of lamp 13). Steps are, therefore, termed "probable" when the movement required of the pointer 5 conforms to the higher probability; steps outward from the positions identified by lamps 10 and 12 are referred as "improbable." Responses of a test subject which result in the pointer moving from a position identified by the lamp 11 in response to the stimulating illumination of another lamp are termed "equiprobable" because the two possible directions of movement are equally probable.

In use, a person under test is seated or stands in front of the panel having the display arrangement of FIG. 1 thereon and the electric lamps 9 through 13 are illuminated in turn in the predetermined sequence so as to produce a plurality of visual stimulating events. The test subject must then move the pointer 5 by way of the handle-operating means 1 so that the pointer 5 is aligned with that lamp which is illuminated. As will be clear, when a particular lamp is illuminated, it will be an automatic reaction of some test subjects to move the handle-operating means in the same direction as in the direction of lamp illuminated. However, due to the incompatible relationship provided by the meshing toothed wheels 7 and 8, that immediate reaction may be inaccurate and the pointer 5 may move in a direction away from the desired position. Even when subjects are highly trained and not under experimental stress, it has been found that this incompatible relationship results in an appreciable number of movements that start in the wrong direction (classified as "errors"). In this specification, the term "accuracy" is intended to mean that a correct decision was taken before initiating action which resulted in movement of the pointer 5, whilst the term "precision" is intended to indicate a fine control of the respective activity, i.e. movement of the pointer 5.

In order to determine when the point 5 is in the correct position identified by the respective illuminated one of the lamps 9 through 13, a corresponding series of fixed target contacts 14 through 18 is provided, each in a position between the respective target lamps and the axis of rotation of the composite pointer 5 and 6. The pointer-carrying portion 6 is provided with an electrical moving target contact 19 on its undersurface. When the pointer 5 assumes a position corresponding to an illuminated one of the lamps 9 through 13, then the moving target contact 19 will make electrical contact with the respective one of the fixed target contacts 14 through 18 whereby an electrical circuit is completed to provide an indication that the pointer 5 is in that position corresponding to the illuminated lamp.

In some experiments, it is useful to record the number of contact movements which start in the wrong direction when a test subject is under test. In order to determine this, two fixed error contacts 20 and 21 are provided adjacent to the fixed target contact 15, each on opposite sides of the line joining the lamp 10, the fixed target of contact 15 and the axial point about which the portion 6 rotates. Similarly, two fixed error contacts (not shown) are provided in the vicinity of the fixed target contact 16 whilst two fixed error contacts 22 and 23 are provided in the vicinity of the fixed target contact 17 as can be seen from FIG. 1. In the vicinity of the extreme fixed target contacts 14 and 18, respective fixed error contacts 24 and 25 are also provided.

In order to provide an indication of the error in the positioning of the pointer tip 5, a moving error contact 26 is provided on the pointer-carrying portion 6 and is capable of making slidable electrical contact with any one of the fixed error contacts 20 to 25 inclusive.

The provision of the moving error contact 26 and the associated fixed error contacts will, of course, facilitate the recording of movements that start in the wrong direction (and are thus errors). These movements are an important indication of the skill of individuals and of any impairment of their performance caused by stress. It is preferable to record these errors separate from minor lack of precision in a movement, that could terminate with the moving error contact 26 aligned with a fixed error contact. Such imprecision could lead to an error being recorded when the target changed, unless special provisions were made as shown. At each position, the fixed error contacts are displaced to the side of fixed target contacts so that in cases where the fixed and moving target contacts are precisely aligned, the fixed and moving error contacts cannot make contact. The circuit to be described with reference to FIGS. 2 and 3 ensures that the instruments used for recording the subject's errors and other aspects of his responses do not operate unless the moving and fixed target contacts are precisely aligned at the instant when a target changes position. The above arrangements ensure that minor imprecision in terminating one movement is not recorded as an initial error in the next tracking response.

The associated circuitry is designed so that the pointed tip 5 must be within the tolerance zone of ±0.1 inch from the center of the respective target lamp before the next target lamp will be illuminated or a reaction time or an error is recorded. It will be appreciated that any desired tolerance range may be selected.

In order to record the movement of the pointer 5, the control drive of a resistance potentiometer is connected to the toothed wheel 8 whereby movement of the pointer 5, due to movement of the handle-operating means 1, results in a change in the potentiometer setting whereby an indication may be produced on a moving chart or in a tape recording. The time of commencement of illumination of the respective target light and the position of the target light will also be recorded by the electrical circuit associated with the display arrangement of FIG. 1. For example, the potentiometer is driven by movements of the hand lever 1 (FIG. 1) and the varying electrical signals produced in tracking are used to drive one pen of the conventional type of electrical moving chart recorder. A second pen is driven by impulses that energize the targets; the electrical connection of each target to the pen contains a resistance of different value. The second pen is thereby deflected a different amount by an impulse energizing each different target, and later analysis can detect the time of appearance and disappearance of each of the targets. In this way, a detailed analysis of the test subject's response can be made from different psychological aspects.

Experimental tests on a number of subjects have indicated that a subject who reacts to a visual stimulating event (e.g. the illumination of a particular lamp) in about 0.3 seconds will usually make an error whereas if his reaction time is slightly longer, about 0.4 seconds, then he usually makes a correct response. A subject with a preference for speed, rather than accuracy, will often save a little time by assuming that events will unfold in a familiar expected manner. Thus, previous devices which have always produced stimulating events in the most probable sequence tend to give incorrect results when a subject is particularly intelligent or familiar with the particular test. In the described embodiment of the present invention, due to the incompatible relationship between the handle-operating means 1 and the pointer 5 and also due to the arrangement of the lamp sequence so as to include an improbable factor, there is a truer test of the relevant characteristics of a subject. A subject's preference for speed or accuracy and his estimate of probability are always involved, for example, when a subject driver is approaching a traffic junction that is normally deserted and also in deciding whether to overtake another vehicle on a winding road which has light, oncoming traffic. By use of the described embodiment of the present invention, it is possible to measure the speed and precision of reaction of a subject, as well as the subject's judgment of probability and preference for speed or accuracy. The latter characteristics are normally more important than the former in judging whether a subject is likely to become, for example, a safe driver, pilot or machine operator. By using the described embodiment of the present invention, it will be clear that these important characteristics can be examined.

By using the describing embodiment of the present invention, one can obtain an estimate of a subject's judgment of probabilities, his preference for speed or accuracy and for detecting long reaction times which reflect potentially dangerous lapses of attention. The task of step-input tracking which is involved, as opposed to the serial tracking of previous devices, has properties in common with such tasks as driving and flying and it has been found that incorrect movements or small errors of 0.1 inch may be detected and penalized.

As mentioned above, different individuals react in different ways to the same amount of alcohol. The breathalyzer instrument, mentioned above, cannot detect these individual differences nor can it detect the highly adverse aftereffects of drinking on the tracking skill of the subject under test. It is believed that these aftereffects remain long after breathalyzer readings have fallen to zero. By skillful use of an embodiment of the present invention, it is possible to detect impairment of tracking skill even when only a small amount of alcohol has been consumed and even some hours after the breathalyzer readings have dropped to zero. Control tests have also shown that it is possible to detect impairment due to the sleep deprivation in a test period lasting only one minute. It is also possible to determine whether aircraft pilots, coach drivers and others engaged in hazardous occupations, are dangerously impaired by long spells of duty, sleep deprivation, spraying insecticide and other forms of stress.

The stress may, of course, be artificially produced so as to experimentally determine the subject's ability to tolerate stress, caused by, for example, the consumption of alcohol, sleep deprivation, harmful atmospheric, chemical or radioactive influences and to determine whether a subject's ability to control a machine is then impaired to a dangerous degree. The experimental test may conveniently be incorporated in an examination to determine a person's suitability to be granted a licence for a particular activity.

By using the display arrangement illustrated in FIG. 1, together with appropriate electrical circuits, it will be appreciated that several characteristics may be conveniently measured for psychological investigation to determine certain characteristics of a subject. For example, measurements may be made in connection with the factors listed below:

1. Reaction Time: The reaction time of the patient may be measured, as mentioned above, and it will be appreciated that this is the period of time elapsing between the illumination of one of the lamps 9 through 13 to the beginning of a subject's response thereto resulting in movement of the pointer 5 (FIG. 1).

2. Errors: Errors may be noted in that movements as small as 0.1 inch that start in the wrong direction may be registered on a counter or similar device.

3. Time in Error: Time in error may be determined and recorded on a suitable instrument. This time is defined as the period wherein the pointer, starting in the wrong direction, lies on the wrong side of its initial starting position.

4. The number of Reaction Times Exceeding a Predetermined Value May Be Recorded: Controlled experiments of sleep deprivation have shown that, with increased sleep loss, there is a large rise in the number of wrong reaction times, exceeding 0.4 seconds and this number may be recorded.

In different embodiments of the invention, one may adopt different latencies as threshold values for a subject.

5. The Number of Targets Acquired May Be Counted: This count is, therefore, the number of occasions when the pointer 5 is within a small tolerance zone, centered on the target light, when a new target (illumination of a lamp) appears. In one constructed embodiment of the invention, a tolerance zone of ±0.1 inch was used but other tolerances may, of course, be used.

6. Time on Target: Time on target may be measured so that there is a record of the total time that the tracking pointer 5 is precisely aligned with the respective illuminated one of the target lamps 9 through 13.

The necessary measurements in connection with the above can be registered on known types of counter or timer devices. Additionally, the potentiometer which is driven by movement of the pointer-carrying portion 6 is arranged to record the movements of the pointer on a moving chart or, alternatively, a tape recorder, as well as the time of onset and the position of the respective illuminated one of the target lights 9 through 13. By analysis of the recorded information, different aspects of the performance of the test subject may be studied in detail.

It will be apparent that, by connecting different electrical circuits and different types of counters and/or recorder units to the potentiometer and the electric lamps and electrical contacts illustrated in FIG. 1, different psychological tests may be made on each test subject. For example, in one embodiment of the invention, the associated circuitry may be so constructed that the time taken for a run or sequence of illumination of the lamps 9 through 13 is constant. The number of target lamps correctly acquired, i.e. the number of times the pointer assumes a correct position corresponding to a stimulating illuminated lamp, will not be the same for different test subjects. In another embodiment of the invention, the test of subjects may each be required to correctly "acquire" one target before the next target lamp is illuminated. All subjects will then acquire all the targets but there will be a difference in the time taken by different test subjects for a complete run, i.e. the correct achievement of a predetermined sequence of illumination of the target lamps 9 through 13. For example a test sequence may be made up of one hundred steps, each corresponding to the illumination of a target lamp. The target lamps will thus be illuminated a number of times during a sequence and the order of illumination may be varied throughout the test sequence.

In FIGS. 2 to 9, there are illustrated electrical control circuits for use in apparatus constructed according to one embodiment of the present invention.

Figure 2:
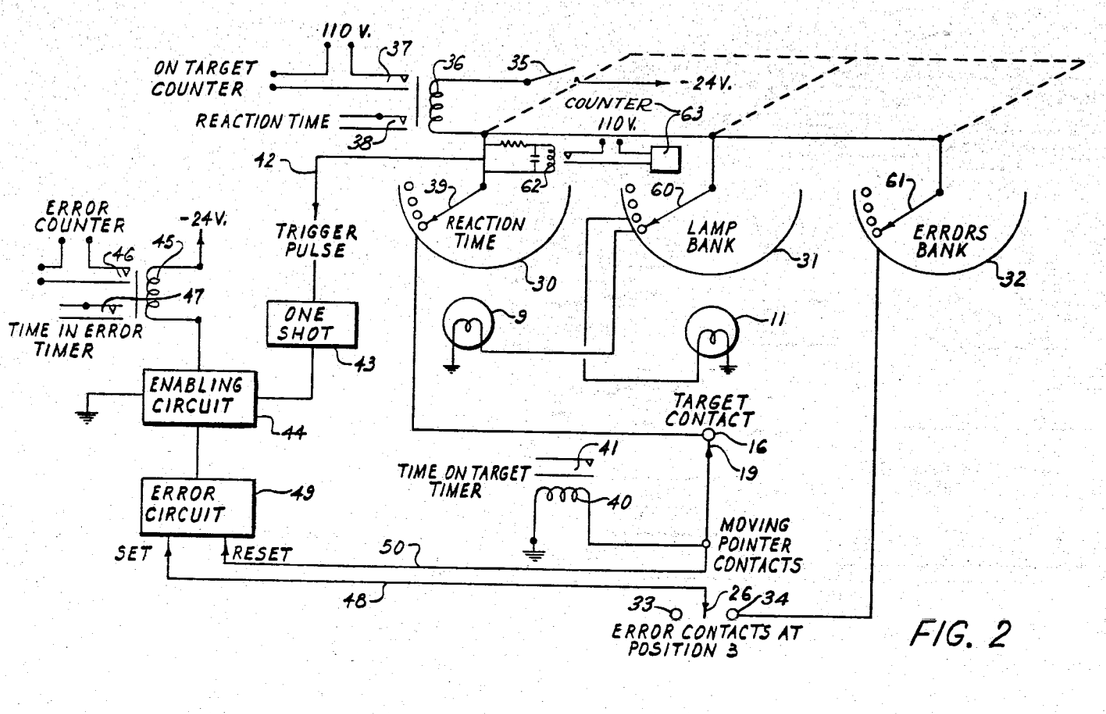
FIG. 2 is a diagrammatic representation of an electrical circuit forming part of the first embodiment of the invention.

FIG. 2 is a general block schematic of the electrical control circuit whilst FIG. 3 is a rather more detailed block schematic of the electrical control circuit and FIGS. 4 to 9 illustrate examples of subsidiary electrical control circuits which may be utilized according to the first embodiment of the present invention.

Referring to FIG. 2, it will be seen that the circuit includes a uniselector switch and three of the banks of contacts are identified by the numerals 30, 31 and 32. Part of the electrical circuit to the lamp 9 (FIG. 1 and FIG. 2) at the first position and to lamp 11 at the third position is indicated in FIG. 2 and the movable contact arms of the uniselector banks 30, 31 and 32 are set so as to indicate the operation of the electrical circuit when the pointer 5 is moved from position 3, corresponding to lamp 11, to position 1, corresponding to lamp 9. It will be appreciated that similar circuitry is provided for the other lamps identifying the different positions at which the pointer 5 may be positioned.

Referring to FIG. 2, it will be seen that the fixed target contact 16 and the movable target contact 19 (integral with the pointer-carrying portion 6) are indicated in addition to the two fixed error contacts 33 and 34 which are provided at the third position below the pointer-carrying portion 6 of FIG. 1. The movable error contact 26 is also indicated in FIG. 2.

It should be mentioned here that movement of the movable arms of the uniselector switch is controlled by a Bowes oscillator circuit which illustrated in FIG. 4 and will be described later. The oscillator circuit is designed to advance the movable contact arms of the uniselector switch and to cause the respective target lamps to be illuminated at intervals in a predetermined sequence and to remain illuminated for a predetermined period of time. The bank of contacts 31 is electrically connected to supply power to the selected one of the target lamps 9 through 13 and in FIG. 2, it will be seen to be connected so as to supply power to the lamp 9 in position 1. Its movement is assumed to be anticlockwise and, therefore, the bank of contacts of the uniselector have just moved from a position at which the lamp 11 at position 3 was illuminated onto a position, as illustrated, at which the lamp 9 at position 1 is illuminated so that the test subject must now operate the handle-operating means so as to move the pointer from position 3 (lamp 11) to position 1 (lamp 9).

Even though the lamp 9 in position 1 has just become illuminated, the test subject has not reacted thereto and, therefore, the pointer 5 (FIG. 1) is still in a position corresponding to lamp 11 in the third position. Therefore, the moving target contact 19 is still making electrical contact with the fixed target contact 16. Referring to FIG. 2, it will be seen that this condition is clearly illustrated because the moving target contact 19 is diagrammatically shown in FIG. 2 as well as the fixed target contact 16. The movable error contact 26 can also be seen in FIG. 2, together with the fixed error contacts 33 and 34 corresponding to position 3 of pointer 5.

One bank of contacts 30 of the uniselector is so connected as to facilitate the measurement of the reaction time of the test subject before he commences to move the pointer 5 towards the next illuminated lamp. It will be seen that the movable contact of the bank of contacts 30 completes an electrical circuit from a 24-volt supply, through the starting switch, through the winding 36 of an on-target relay contact 37 and a reaction time contact 38, through the movable contact arm 39 of the bank 30 of the contacts of the uniselector, through the target contact 16, the movable target contact 19 and thence, through a winding 40 of a "time on-target" timer to ground potential. Current thus flows through the movable wiper arm 39 of the reaction time bank 30 so as to add one count to the "on-target" counter associated with winding 40 by way of the time on-target contacts 41. This current only flows because the movable target contact 19 and the fixed target contact 16 are accurately aligned when the new target lamp 9 is illuminated. The reaction time timer, operated via contact 38, will continue to run until the test subject moves the handle-operating means 1 so as to break the electrical contact between the movable target contact 19 and the fixed target contact 16.

A trigger pulse is also sent along line 42 to a one-shot multivibrator circuit 43 which thus enables an AND gate circuit 44 which is thus prepared for subsequent resetting so as to energize the winding 45 to close error countercontacts 46 and "time-in-error" timer contacts 47 should an error occur whereby the appropriate information may be recorded. It will be seen from FIG. 2 that the fixed error contacts 33 and 34 and the movable error contact 26 (FIGS. 1 and 2) are electrically connected to the "ERRORS" bank of contacts 32 of the uniselector so as to control operation of the error circuitry. The "error" bank of contacts 32 is wired so as to correspond to the predetermined sequence of operation of the lamps 9 through 13.

In use, when lamp 9, at position 1, is illuminated after lamp 11, at position 3, a pointer movement to the right would be an error so that the "error" bank of contacts 32 would apply a voltage to the fixed error contact 34. The movable error contact 26 would contact the fixed error contact 34 and a voltage would be supplied along line 48 to the SET input of an associated error circuit 49. Thus, the error circuit 49 will be triggered so as to trigger the AND gate enabling circuit 44 which has previously been prepared by the multivibrator circuit 43. Thus, current flows through winding 45 to trigger the error counter by way of contact 46 and to initiate operation of the "time-in-error" timer through contact 47. The timer (not shown) connected to contact 47 would continue to run whilst the pointer 5 was on the wrong side of position 3 and the movable error contact 26 was in electrical contact with the fixed error contact 34. It would, however, stop as soon as the pointer movement reversed so as to pass the appropriate point and travelling in the correct direction towards the illuminated lamp 9 at position 1. Resetting of the error circuit 49 would be accomplished by way of a reset input voltage being applied along line 50 through the fixed target contact 16 and the movable target contact 19.

In operation, the stepping relay coil of the stepping switch (FIG. 5) is energized at preselected temporal intervals to advance the gauged moving wiper blades 39, 60, and 61 (FIG. 2) which are connected to the —24 volt supply when the starting switch 35 is closed. The stepping coil (FIG. 5) is energized by square waveform impulses emitted by a free-running, emitter-coupled multivibrator using transistors, which is fully described by R. C. Bowes in a paper entitled "A New Linear Delay Circuit Based on an Emitter Coupled Vibrator," published in the Proceedings of the Institution of Electrical Engineers, 1959, Vol. 106, Part B, Supplement 15—18, pages 793—800. Variable resistance-capacitor networks of conventional type provide a range of different leakage rates and time constants to permit selection, before a run begins, of a specific period of target appearance and of a required temporal interval between the appearance of successive targets. The arrangements permit the disappearance of one target before another appears or for targets to follow each other without intervening delay. Conveniently, each lamp may be arranged to be illuminated for about 2 seconds.

The bank 31 of the stepping switch has a plurality of fixed impulse delivery contacts which are energized in turn, as the wiper blade 60 advances. Each fixed contact of the stepping switch is connected to a specific target. The fixed contact underneath this target is also energized so that the timer associated with contact 41 and which records the total time on target, is activated when the moving target contact 19 is aligned precisely with the new target. Reaction time relates to the delay in moving from the old target position and erroneous movements begin from the position of a previous target. In order to record these reaction delays and any directional errors in initial movements, it is necessary to energize the fixed target contact and the fixed error contacts, through wiper arms 39 and 61 respectively, at the position just vacated by the target. Steps of the arms 39 and 61 lag one target behind the steps of arm 60.

FIG. 2 illustrates the condition where the moving target contact 19 is precisely aligned with the energized, fixed contact 16 when the new target lamp 9 is energized. This alignment is a necessary condition for the following events to occur. Current flows through the starting switch 35, the relay 36, the wiper arm 39 of the stepping switch, the fixed and moving contacts 19 and 16 respectively, through the relay coil 40 and on to earth by the connections shown. A trigger pulse flows through line 42 to the one-shot circuit 43 and onward to the AND gate 44, i.e. an enabling circuit which is thereby readied to conduct an impulse from the error circuit 49 should the subject respond in the wrong direction. The action of relay 36 actuates the counter connected to contact 37 and which records the number of times that a target is acquired with precision at the instant when the target changes its position. Relay 36 also starts a time integrating instrument which registers reaction time and is connected to contact 38. The timers connected to contacts 38 and 41 are stopped when the subject responds to the new target lamp 9 and moves the contact 19 from the fixed target contact 16.

Each of the fixed impulse delivery contacts of the error bank 32 of the stepping switch is connected to one of the fixed error contacts 22 to 25, 33 or 34, in a pattern which conforms with the preselected pattern of energizing the target lamps from bank 32. As noted previously, fixed error contacts are energized at the position just vacated by a target. In FIG. 2, for example, when target lamp 9 is energized (illuminated) following the illumination of lamp 13, an impulse is transmitted simultaneously to fixed error contact 34 at the right of position 3, through wiper arm 61 and the connections shown, because a movement of pointer 5 to the right would constitute an error. In this embodiment of the invention, a small movement in the wrong direction will trigger the error circuit 49 through the connection 48 to pass current through the enabling circuit 44 that was readied previously by the action of the one-shot circuit 43, as described above. The discharge through the enabling circuit 44 energizes relay 45 to add one count to the error counter instrument 12 that records the number of errors in a run and is connected to contact 46. The discharge also starts a time integrating instrument connected to contact 47 that registers the total time that the moving target contact 19 lies on the wrong side of an energized, fixed target contact e.g. 16 in FIG. 2. The connection numbered 50 in FIG. 2 transmits an impulse to stop the "time-in-error" timer connected to contact 13 when the incorrect movement of the pointer 5 is reversed and the moving target contact 19 passes the fixed contact 16 while travelling in the correct direction.

The relay coil 62 is operated by a conventional resistance and capacitor network with a leakage rate designed to produce a time constant of a specified value and a reaction time equal to, or exceeding this value will produce an impulse in the circuit and add one count to the recorder 63, which thus indicates the total number of times in a run that the subject's reaction time exceeds some specified value.

It will be appreciated that care can be taken to ensure that a test subject does not learn the predetermined sequence of illumination of the target lamps 9 through 13. Such learning can be prevented by, for example, arranging that the respective electrical locations of positions 1 and 5 and positions 2 and 4 of the target lamp are interchanged by way of changeover switches in a well-known manner. Similarly, a test run may comprise one hundred steps and this may be divided into ten blocks of ten blocks each. A changeover switch may then be provided whereby a change in the order in which the respective blocks are presented in any one run is achieved. Furthermore, a run of 100 steps can be started from any one of the 20 steps that commence at position 3 (corresponding to lamp 11).

If desired, the described embodiment of the invention may be utilized to study the learning processes of a test subject. This may be done by arranging that each of the target lamps 9 through 13 is illuminated for a period of time and is then extinguished for an equal period of time before the next lamp is illuminated. A record of the eye movements of a test subject is then made and it will be round that, as the learning of the test subject proceeds, as one target lamp is extinguished and the next target lamp is to be illuminated so the test subject's eyes make the correct anticipatory movement necessary for them to be facing towards the position where the next target lamp will be illuminated.

Figure 3A:
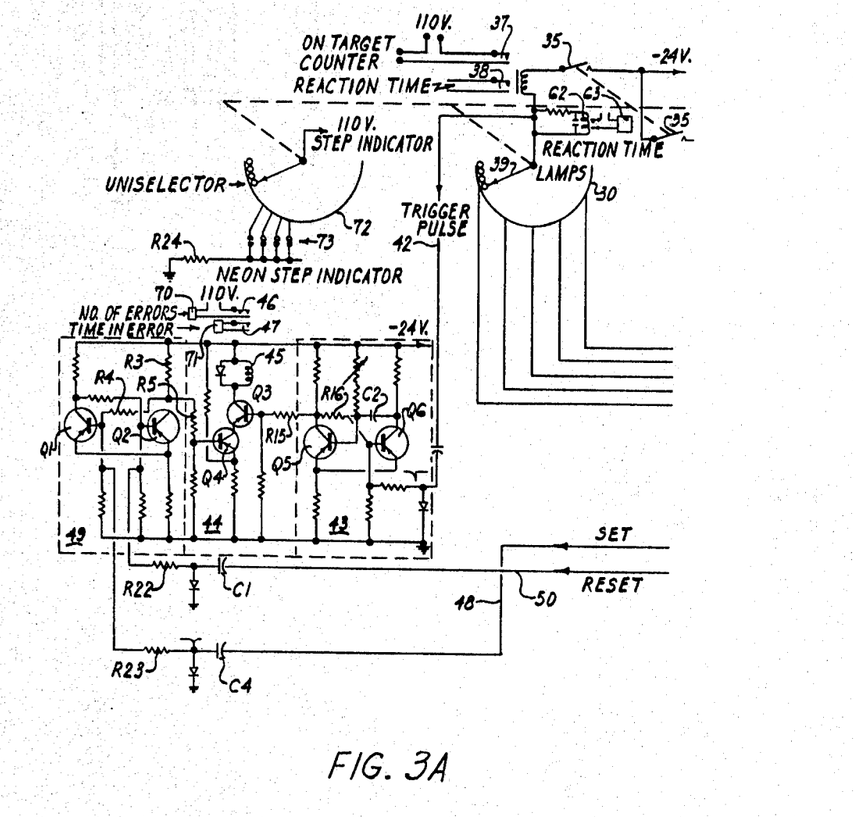
FIG. 3 is made up of FIGS. 3A and 3B, arranged side by side as in FIG. 4, and shows the electrical circuit of FIG. 2 in greater detail to facilitate an understanding of its operation.
Figure 3B:
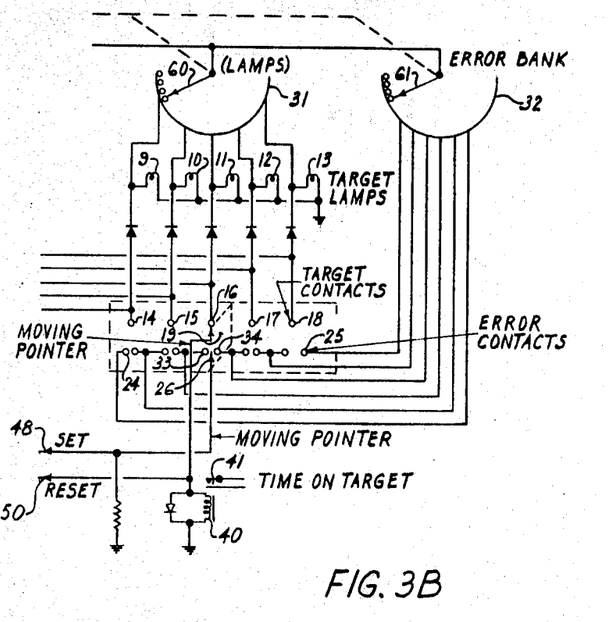
Figure 4:
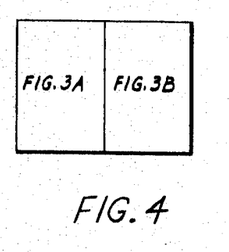
FIG. 4 illustrates the arrangement of FIGS. 3A and 3B to constitute FIG. 3.

Referring now to FIG. 3 which comprises FIGS. 3A and 3B, arranged side by side as shown in FIG. 4, there is shown the electrical circuit of this embodiment of the invention in greater detail than in FIG. 2. All the target lamps 9 through 13 are diagrammatically illustrated together with the associated fixed target contacts and fixed error contacts.

Wherever possible, the same reference numerals have been applied to like parts in FIG. 3 as were applied in FIG. 2. As will be seen, the one-shot multivibrator circuit 43, the enabling circuit 44, and the error circuit 49 of FIG. 2 are shown in greater detail in FIG. 3. The transistor circuits which make up these particular operational circuits are indicated in FIG. 3 and, for convenience of description, some of the components making up the respective electrical circuits have been identified by suitable letters and numerals.

As will be clear from the above description with reference to FIG. 2, the one-shot multivibrator circuit 43, the enabling circuit 44, and the error circuit 49 are used in registering errors and in ensuring that imprecision in terminating one movement is not recorded as an error in beginning the next response. In use, a trigger pulse travels along connection 42 to the one-shot multivibrator circuit 43 made up of transistors Q5 and Q6. These transistors Q5 and Q6 are respectively conducting and nonconducting before the arrival of the trigger pulse and when the negative trigger pulse is applied to the base of transistor Q6, this transistor is caused to conduct. The transistor Q5 is cut off by a positive pulse which is conducted from the collector of Q6 to the base of Q5 through capacitor C2. This cutoff is aided by feedback from the collector of Q5 to the base of Q6 through resistance R16. The increasingly negative voltage of the emitter of Q5 goes through resistance R15 to the base of Q3 which conducts and enables recorders 70 and 71, connected to contacts 46 and 47 respectively, to register any error that may occur. The time constant of the one-shot circuit 43 is determined by the capacitor C2 and associated resistances shown in FIG. 3. This time is the limiting period during which the transistor Q3 can conduct; at its end, the discharge from the capacitor C2 can no longer hold Q5 in a nonconducting state and the circuit reverts to its original state with Q5 conducting and Q6 cut off.

The transistors Q1 and Q2 are used in the bistable flip-flop error circuit 49 where they are cut off and conducting respectively, in the normal, reset condition. Should an error occur, the circuit is set by the moving error contact 19 touching that one of the fixed error contacts 14 to 18 inclusive which is energized from the fixed impulse delivery contacts of the error bank 32 of the uniselector via the wiper arm 61 and the starting switch 35. The negative pulse is carried by connection 48 via capacitor C4 and resistance R23. The resulting negative state at the base of transistor Q1 causes it to conduct and the positive impulse from its emitter to the base of Q2 cuts off the latter transistor. This produces a negative state at the base of transistor Q4 from the −24 volt supply via resistances R3 and R5. Current can then flow through transistors Q3 and Q4; the former was previously put in a conducting state by the trigger pulse to the one-shot circuit. The current flow operates the coil of relay 45 to operate the recorder 70 that registers the total number of errors and the time integrating instrument 71 that registers the total time wherein moving target contact 19 lies on the incorrect side of its starting position. The flip-flop circuit 49 is reset via connection 50 when the incorrect movement is reversed and the pointer 5, moving in the correct direction, passes its starting position of the fixed target contact last energized that transmits an impulse to moving target contact 19. The negative impulse is conducted via capacitor C1 and the resistance R22 to the base of transistor Q2. The latter will then conduct and the positive discharge from its emitter will affect the bases of transistors Q1 and Q4 through related resistances to cut off both transistors and return the flip-flop circuit to its initial state.

An impulse is generated in the circuit containing capacitor C5 and resistance R26 whenever the subject's reaction time reaches a specified threshold value. The impulse energizes the relay coil 62 to operate counter 63 which registers the total number of times in a run when the subject's reaction times equal or exceed the said threshold value.

In FIG. 3, an additional uniselector bank of contacts 72 is illustrated, together with an associated series of neon indicator lights 73. The neon lights 73 are utilized to indicate the starting position of the uniselector and sequence of illumination of the target lamps when a manually operable switch is utilized, in a manner to be described, to reduce the possibility that a test subject may memorize the special pattern of illumination of the lamps 9 through 13 (FIG. 1).

Figure 5:
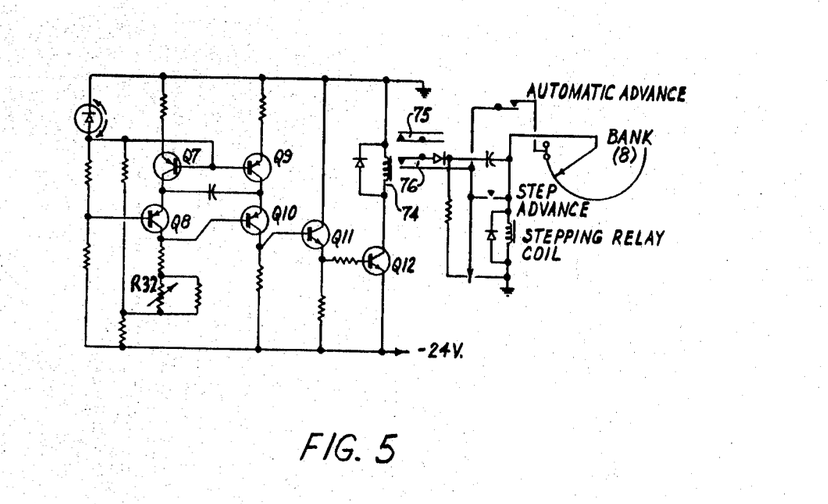
FIG. 5 is an electrical circuit of a Bowes oscillator for controlling the movement of the wiper arms of the uniselector shown in FIGS. 2 and 3.

In FIG. 5, there is illustrated a Bowes oscillator for controlling the movable switch arms of the uniselector device. The circuit is principally a free-running emitter coupled, multivibrator circuit using transistors and has been fully described, as mentioned above, in a paper entitled "A New Linear Delay Circuit Based on an Emitter Coupled Multi-Vibrator" by R. C. Bowes, published in the Proceedings of the Institution of Electrical Engineers, 1959, Vol. 106, Part B, Supplement 15—18, pages 793—800. The circuit will not be described in detail but it will be seen to include transistors Q7 to Q12 for automatically generating pulses of current for passage through a winding 74 of a relay coil for control of the illustrated contacts 75 and 76. A corresponding opening and closing of the relay contacts 76 is effective to control the operation of the stepping relay coil 77 so as to advance the movable contact arms, such as 39, 60 and 61 (FIG. 3) of the uniselector whereby the target lamps 9 through 13 are illuminated in said predetermined sequence. The frequency of the pulses passing through the winding 74 can be controlled by means of a variable resistor R32 in the Bowes oscillator circuit.

Figure 6:
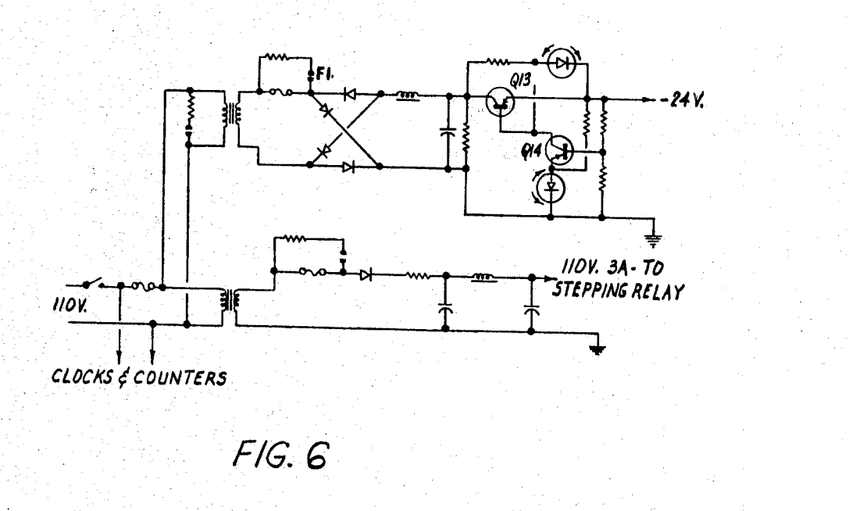
FIG. 6 shows a power supply circuit for supplying power to the electrical circuits in the first embodiment of the invention.

In FIG. 6, there is illustrated a circuit for supplying power to the various electrical circuits, relays, clocks and counters which are utilized in the described embodiment of the invention. The power supply circuit is relatively straightforward and will be understood by a person skilled in the art.

Figure 7:
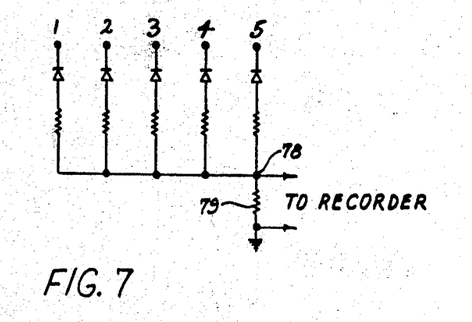
FIG. 7 shows an electrical circuit connected to the stimulating lamps of FIG. 1 and capable of providing signals to a recording means to indicate that lamp which is illuminated.

In FIG. 7, there is shown a typical arrangement for providing a distinctive signal for each of the five target lamps 9 through 13. For each target lamp, there is provided a separate diode-resistor circuit and in FIG. 7, it will be seen that the diode-connected terminals are identified by the numerals 1 to 5 corresponding to the positions of the target lamps 9 through 13. Each resistor of the diode-resistor combinations is connected to a common point 78 and a further common resistor 79 is connected between point 78 and ground potential. A recorder (not shown) is connected between the point 78 and ground potential. The resistors in the diode-resistor combinations are so chosen that when a lamp is illuminated, then a current flows through the respective diode-resistor combination which is distinctive of that combination and the resultant current through the resistor 79 causes a signal to be passed to a moving chart recorder whereby the pen of the moving chart recorder is deflected by an amount dependent on which diode-resistor combination was passing current. In this way, the chart can be examined at a later date and it will be quite clear which target lamp was illuminated at a particular time. As will be appreciated, the circuitry may also be used with a tape recorder or other type of recording instrument.

Figure 8:
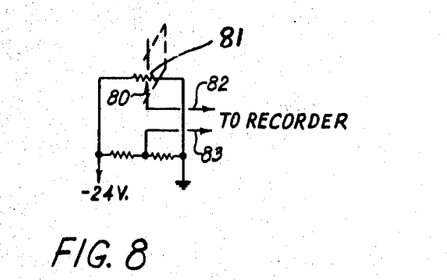
FIG. 8 shows an electrical control circuit including a potentiometer controllable by movement of the handle-operating means of FIG. 1 and capable of providing control information to a recording means.

In FIG. 8, a straightforward circuit is illustrated whereby the movements of the composite pointer 5 and 6 (FIG. 1) can be conveniently and continuously recorded. The toothed wheel 8 which is attached to the pointer-carrying portion 6 is arranged to drive the movable resistor contact arm 80 of the potentiometer 81. In this way, a current is supplied along connections 82 and 83 to a suitable recorder instrument whereby a continuous recording of the movement of the pointer 5 can be made on a chart recorder or tape recorder.

Figure 9:
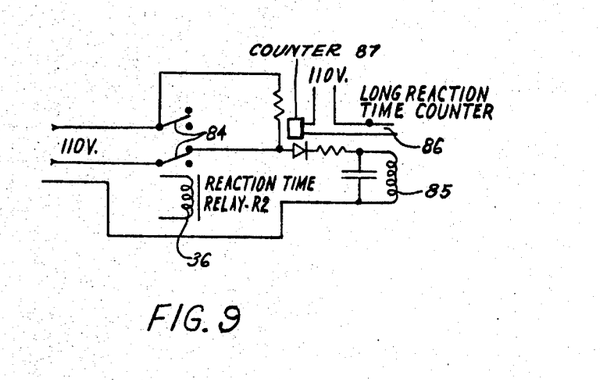
FIG. 9 shows an electrical circuit for determining the number of times the reaction time of a subject exceeds a predetermined length.

As mentioned above, it is often desirable to determine when the reaction time of a test subject exceeds a predetermined value, for example, 0.4 seconds. In FIG. 9, there is illustrated a circuit which may be used for determining when the reaction time of a test subject exceeds a particular value. The reaction time relay 36 (also shown in FIGS. 2 and 3) moves relay contacts 84 when it is energized. The resistor-capacitor network has a time constant of 0.4 seconds and, after a delay of 0.4 seconds, a reaction delay relay 85 operates so as to close contacts 86 and provide an impulse to a long reaction time counter 87. Thus, one count is added to the counter which thus indicates the total number of times that the subject's reaction time is 0.4 seconds or above.

Figure 10:
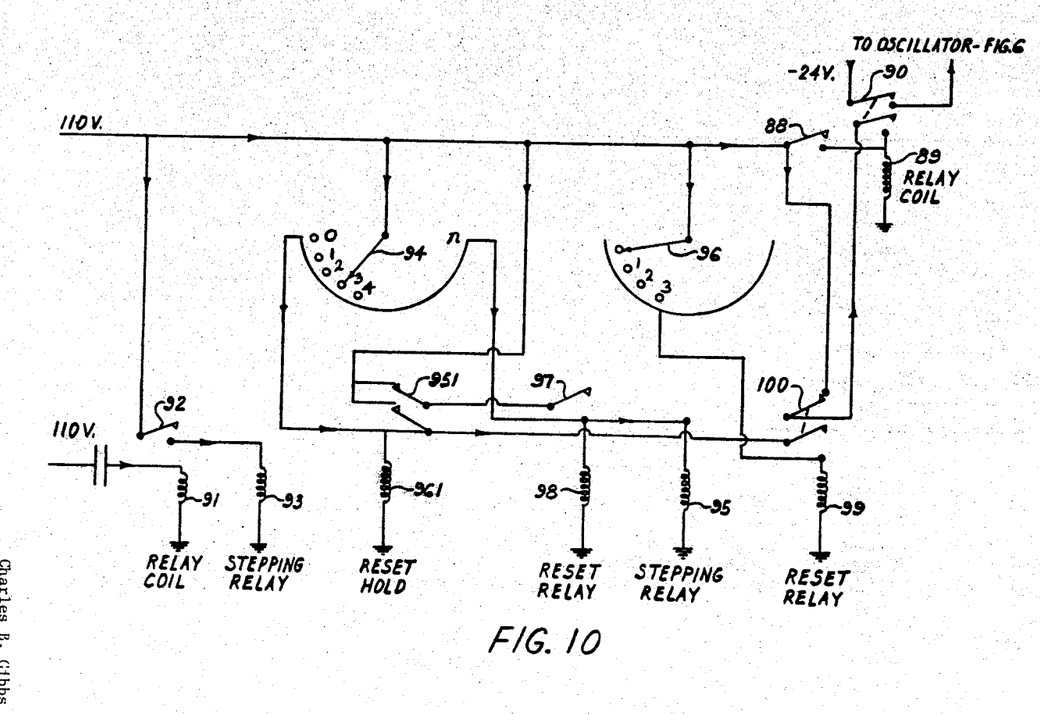
FIG. 10 shows a relay circuit for initiating operation of the uniselectors of FIG. 2 and stopping the wiper arms of the uniselectors after a predetermined run or sequence of operations of the stimulating lamps as shown in FIG. 1.

In addition to the circuits described above, it is also necessary to provide a circuit according to this embodiment of the invention whereby the sequential illumination of the target lamps 9 through 13 may be started and also stopped at the end of a test run. In FIG. 10, such a circuit is illustrated whereby a test run may be started and automatically stopped after the required number of steps.

Referring to FIG. 10, the operation of the circuit is initiated by momentarily closing switch 88 so as to supply 110 volts to relay coil 89. This causes the contacts 90 of relay coil 89 to be closed so as to transmit −24 Vdc to the Bowes oscillator circuit shown in FIG. 6. Pulses from the oscillator circuit of FIG. 6 are thus arranged to be transmitted from the stepping relay 77 (FIG. 6) to a relay coil 91 as shown in FIG. 10. The contacts 92 of relay 91 are closed by each impulse so as to admit 110V. AC to a relay coil 93 so advancing stepping switch 94 one step for each impulse. As the moving contact arm reaches the final step $n$ of this switch, the AC supply flows through the wiper arm and fixed contact to stepping coil 95 to advance the wiper arm of stepping switch 96 by one step. At the same time, the reset relay 97 is energized, to start the return of the wiper arm of stepping switch 94 to its initial position. When this wiper arm leaves fixed contact $n$, the 110V. supply is cut off and an alternative supply must be provided to continue the resetting process until the wiper arm returns to the initial, zero position. A 110v. supply is, therefore, provided to the closed contact 951 of the reset hold relay 961 and to contact 97 which was closed by the previous action of the reset relay 98. This supply maintains the action of the reset relay 98 until the stepping switch arm is reset to the zero position. This point is connected to reset hold relay 961, which is energized to open contacts 951; this halts resetting and permits a new stepping cycle for stepping switch 94. The process of advancing the stepping switches can be repeated as required. FIG. 10 illustrates an example where the run terminates when the wiper of stepping switch 96 is at position 3. At this position, the arm supplies 110v. to the reset relay 99, thus opening the top contact 100 to cut off the 110v. supply to relay coil 89. In consequence, the relay contacts 90 are opened and the −24v. supply to the Bowes oscillator circuit is broken, thus halting the circuit's action. The energizing of relay 99, starts to reset stepping switch 96; the initial 110v. supply route is broken when the wiper arm leaves position 3. An alternative route is provided by the closed, lower contact of 951 and of 100 which was closed previously, by the action of reset relay 99. This supply is cut off in turn when the wiper arm of stepping switch 96 returns to the zero position. The wiper arm of stepping switch 94 is at its final position $n$ when the wiper of stepping switch 96 is at position 3. The former switch is returned to its zero position by the action previously described.

The embodiment described above has been described with reference to the use of relay circuit and stepping switches. It will be appreciated that other devices may conveniently be used and, for example, a flip-flop logic and solid state circuitry may be utilized in order to construct a second embodiment of the invention. In this second embodiment, the test subject could well use the display and control panel with the arrangement as shown in FIG. 1 for tracking the targets representing stimulating events and presented to the test subject by way of the flashing lamps. According to this second embodiment, a conventional multivibrator circuit may be used to generate square waveform pulses so as to energize flip-flop circuits, target lamps and their associated contacts for preselected, uniform periods. The main difference between the two embodiments is, therefore, in the means of generating a predetermined sequence of electrical pulses for the five target lights.

The circuitry in the second embodiment may be arranged to produce a preselected spatial and temporal pattern wherein each of the five targets and each of the 20 different target steps appear equally frequently. A sequential pattern of 20 targets is generated and is repeated as often as needed to provide a run of the required duration. The basic pattern of 20 targets can be changed by the experimenter between different runs by using a changeover switch.

Two primary flip-flops circuits FF1 and FF2 can be combined in four different ways to provide four different states, i.e. FF1 and FF2 (state 1), FF1 and FF2 (state 2), FF1 and FF2 (state 3) and FF1 and FF2 (state 4). Each state is maintained for the duration of five, successive impulses form the timer, and the state is changed at the end of that period. The primary, flip-flop circuits FF1 and FF2 determine the order of actuating five, secondary flip-flop circuits FF3 to FF7, inclusive. The four different combinations or states of FF1 and FF2 are used to produce four different sequences for operating the five secondary flip-flop circuits FF3 to FF7, inclusive. The following sequences are predetermined by fixed circuit connections, and each flip-flop circuit is denoted by its number. Sequence A is flip-flop 4, 6, 5, 7, 3; sequence B is flip-flop 5, 4, 7, 6, 3; sequence C is 6, 7, 4, 5, 3 and sequence D is flip-flop 7, 5, 6, 4, 3. Each of the five secondary flip-flop circuits has four AND gates and each said gate is permanently connected to its specific target. Each target has connections from four different AND gates, in different secondary, flip-flop circuits, via a conventional OR gate. The permanent connections between different AND gates and target lamps 9 to 13 inclusive, and contacts 14 to 18 inclusive, provide a fixed sequence of energizing targets and contacts that corresponds to and is produced by each of the flip-flop sequences A, B, C and D. The following sequences of energizing target lamps 9 to 13 inclusive, are designated U, V, X and Y and each target is denoted by its number. Sequence U is lamps 12, 13, 9, 10, 11; sequence V is lamps 10, 12, 10, 13, 11; sequence X is lamps 13, 10, 9, 12, 11; and sequence Y is lamps 9, 13, 12, 9, 11. Each sequence ends by energizing target lamp 11, at position 3, and the end of this impulse is used to change the state or combination of the primary flip-flop circuits FF1 and FF2. The four combinations follow each other in a fixed order which is predetermined by circuit connections. A changeover switch is provided so that any one of the four different states or combinations of FF1 and FF2 can be connected to any one of the fixed sequences A, B, C and D of operating the five secondary flip-flop circuits and thus to the corresponding sequence of energizing lights. Each sequence of five targets may appear in the order U, V, X and Y in one run and be changed, for example, to Y, X, V and U, in the next cycle. Twenty different combinations of the target sequences U, V, X, Y can be obtained by use of the changeover switch.

The necessary conditions for the occurrence of a specific state or combination of FF1 and FF2 are the termination of an impulse to target lamp 11 and the arrival of the appropriate state in the fixed order in which states appear, said order being predetermined by permanent circuit connections. The operation of any secondary flip-flop circuit FF3 to FF7 inclusive, is determined by the arrival of a timed pulse from the multivibrator and the correct stage in a sequence that is predetermined by the fixed circuit connections and the temporary connections made by the changeover switch. The activation of a specific AND gate, target and contact depends on the operation of the appropriate flip-flop circuit and the occurrence of the correct stage in the predetermined sequence of targets.

The logic used in activating the fixed target and error contacts is similar to that previously explained for the first embodiment of the invention. As before, it is necessary to energize contacts at the position just vacated by a target in order to record reaction times and errors. In a target movement from position 4 to position 5 for example, contacts 17 and 23 must be energized at the same time as target lamp 13 in order to record reaction time and any error. The change of target from position 4 to 5 is made by actuating flip-flop circuit FF6 following the operation of flip-flop FF4. The newly actuated flip-flop circuit FF6 energizes via fixed connections, the target lamp 13 and contact 18, the target contact 17 at position 4 and the error contact 22 at the left of position 4. These permanent connections to targets and their associated contacts are not changed by operating the changeover switch which alters the order of appearance of the sequences U, V, X and Y, each consisting of five, successive targets. Within each said sequence, the targets and their associated contacts are always energized in a fixed order. Each sequence, U, V, X and Y of five targets, ends with the target at position 3. Therefore, the starting point and direction of the first step in a sequence are always the same, irrespective of the order in which the steps appear and permanent connections can be made to contacts appropriate to this step.

In the second, as in the first embodiment of the invention, an AND gate is provided to ensure that an error is not recorded unless the moving target contact 19 is aligned when an energized fixed contact with a target changes position.

An electronic counter is provided to switch off the instrument automatically after a predetermined number of target sequences have occurred.

In the two embodiments described above, the test subject was presented with stimulating events in the form of illuminated lamps wherein the lamps were illuminated in sequence at predetermined intervals. The time taken for a particular run was, therefore, constant for all test subjects but the number of targets acquired during a particular run was, of course, different for different subjects depending on their response properties or characteristics. It will be appreciated that an embodiment may be constructed according to the present invention whereby each target (a stimulating event) must be acquired with precision in order to trigger the appearance of the next target and thus the total time taken for a run will be different for different individuals.

Figure 11:
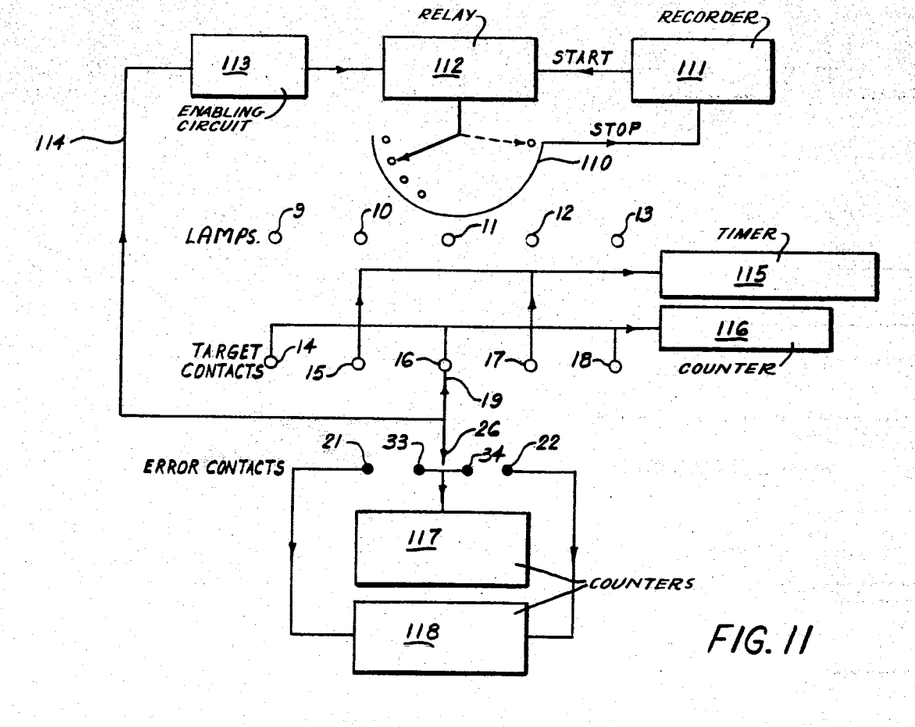
FIG. 11 is a block diagrammatic representation of an electrical circuit for use according to a second embodiment of the present invention.

An embodiment of the present invention in which each target must be acquired with precision in order to trigger the appearance of the next target is illustrated in FIG. 11.

Referring to FIG. 11, the targets 9 to 13 inclusive are shown and below them the fixed target contacts 14 to 18 inclusive, the moving target contact 19 and the moving error contact 26. Only the fixed error contacts 21, 33, 34, and 22 are provided of the eight shown in FIG. 1. A stepping switch 110, or a device with similar functions is used to energize in preselected serial order, the targets and the associated contacts that are used in recording the subject's responses via connections and arrangements that were described previously.

A starting switch (corresponding to 35 of FIG. 1) is closed and this starts a time integrating recorder 111 to register the total time taken by a subject to complete a run. Simultaneously, a stepping relay coil 112 of the stepping switch is activated, the first target and associated contacts are energized and the subject responds to acquire the target. Some rapid, aiming movements of the test subject may overshoot a target and such imprecise movements will not acquire a target and should not trigger the appearance of a new target. An enabling circuit 113 is, therefore, provided which is prepared by a trigger pulse via connection 114 when the moving contact 19 first enters the tolerance zone provided by one of the fixed contacts 14 to 18 inclusive. A delay is imposed by a conventional resistance-capacitor network in the enabling circuit 113. At the end of this delay, a new target will be triggered if the fixed and moving contacts are still aligned. The circuit required to trigger a new target would be similar to that shown in FIG. 3, for actuating the "on-target" counter 10 connected to contact 37 (FIG. 3). Various recorders would also be operated by circuits similar to those already shown in FIG. 3. These recorders are shown diagrammatically in FIG. 11 and they have the following functions:

1. The timer 115 registers the total reaction time on improbable steps.
2. The counter 116 records he number of prolonged reaction times which exceed a specified, threshold value.
3. A counter 117 records the number of errors made on equiprobable steps.
4. Another counter 118 registers the number of errors made on improbable steps.

The run ends and timer 111 is stopped when the uniselector arm reaches a preselected terminal point and delivers an impulse via a fixed, delivery contact, a switch and a relay to open the starting switch corresponding to 35 in FIG. 1 and so stop the run. The timer 111 records the total time that a subject takes to complete a run.

It will be appreciated that the first and second described embodiments of the invention are slightly more complicated and expensive than the third described embodiment of the invention illustrated in FIG. 11. Whilst the first and second embodiments provide greater flexibility, experimental convenience and a wide range of different measures of a subject's performance, the third embodiment appears to be extremely useful for specific purposes, such as selecting suitable personnel for highly skilled tasks and detecting impairment of skill. Six of the measurements which may be made are listed below:

1. The sum of reaction times on all steps.
2. Total number of reaction times exceeding some specific, threshold value, taken from all steps.
3. Total reaction time on improbable steps only.
4. Total errors on improbable steps only.
5. Total errors on equiprobable steps only.
6. Total time taken by a subject to complete a run, instead of the number of targets acquired, that was recorded, in the two previous embodiments of the invention.

It will be appreciated that apparatus according to the present invention may be conveniently constructed so as to take only a selected one of the six measurements listed above. One commercial embodiment of the invention has, in fact, been constructed to determine only three of the measurements listed above. That constructed apparatus determined measurements numbers 2, 4 and 6 above.

Reference was made in the description above to the ability of some test subjects to learn the predetermined sequence of appearance of the stimulating events, i.e. the illumination of the target lamps during a run.

Various methods may be used to impede or prevent the subjects learning the spatial pattern of targets. A sequence of targets can be started at any one of several different points in the cycle. FIG. 3 shows an indicator bank of contacts 72, of the stepping switch. Each of several fixed contacts is wired to a separate indicator light and a manually operated switch is used to advance the wiper arm of the stepping switch to any required starting position that is indicated by its light. For each of the aforesaid starting positions, there is a corresponding stopping position at which the cycle should halt on completing a required number of steps. A manual cutoff switch is provided at each of the aforesaid stopping positions; one contact of each switch is wired to one of the fixed contacts of the stepping switch at each stopping position. The other contacts of all switches are wired to a relay or any other well-known device that an disconnect power from the circuit. At the beginning of each run, the experimenter advances the wiper arms of the stepping switch to the required starting position and closes the cutoff switch at the corresponding stopping positions. Many other devices, for example, well known types of counters, could be used to automatically stop a run after a preselected number of steps.

Total target sequences may be readily changed by the use of multicontact connectors having detachable male and female elements and by providing flexible, multicore cable connections between two sets of male-female connectors. Each of the fixed, delivery contacts of the target lights bank 72, shown in FIG. 3, would be permanently connected to one of the multiplicity of contacts contained in either the male or female element of a detachable connector and this element would be fixed in position. Each of the target lights 9 to 13 inclusive, shown in FIG. 1, would also be connected permanently to one of the multiplicity of contacts contained in either the male or female element of another connector and the latter would be secured in position on the subject's control display panel shown in FIG. 1. The other two, detachable elements of the connectors would be connected by flexible, multicore cable with each lead forming an individual connection between single contacts within the multiplicity of contacts in each element of the connectors at each end of the cable. By such well-understood techniques, any fixed contact of the stepping switch could be connected to any required target source to produce any desired sequence of energizing targets. Several sets of flexible multicore cable and connector elements could be prepared and changed between runs as required. Similar arrangements would ensure that the target contacts and error contacts shown in FIG. 1 would be energized in a sequence that was compatible with the pattern of targets in use.

Many types of contacts and switches can, of course, be used at the subject's panel shown in FIG. 1. The fixed contacts could be metal cylinders, insulated and mounted flush in a plate, the moving contacts could be spring-loaded, metal plungers or discs. Microswitches, Reed relays, photo-diodes and lights and a commutator-type of switch could also be used.

FIG. 1 shows one method for providing an incompatible, directional relation between control and display. An example of another method is a belt running around two pulleys with centers separated in the horizontal plane. A hand grip and a pointer attached to the lower and upper parts of the belt respectively, would produce opposite directions of movement for the grip and the pointer.

There are many possible methods for producing a predetermined sequence of lights with the required provision for recording. An electric motor or a solenoid, pawl and ratchet, could be used to drive a drum carrying cams that could be adjusted for relative position on the periphery of the drum. Five lines of cams would actuate five fixed switches connected directly to energize and change target lights. Another five fixed switches would energize the target contacts shown in FIG. 1; these would be operated by cams lagging one step behind those operating the "change target" switches. Error contacts on the right of all targets would be wired together and connected to one fixed switch that was actuated by cams when a change of target demanded a step to the left. Similar arrangements would be made to record errors on steps to the right.

In a run of 100 steps for example, the periphery of the drum could be divided into 10 equal segments which were made interchangeable to permit changes in the target pattern.

Punched paper tape could be transported at controlled speed and lights and photo-diodes or sampling finger switches could be used to energize target lights and associated contacts in a predetermined sequence.

Similarly, translucent areas could be provided in a drum or strip material that was otherwise opaque and this would be equivalent to punched tape in energizing photo-diodes and generating a program.

In the above arrangements, it would be easy to change the sequence of steps by changing drums or punched tapes.

It will be appreciated that the invention is not restricted to the provision of only one hand-operated lever 1 (FIG. 1). Two levers may be provided, one operated by the left hand, the other by the right. Each lever would be connected to its own display pointer by gears, or other means of reversing motion so that pointers and control levers move in opposite directions. Three separate displays, each comprising five target lights would be provided. One set would provide targets for tracking by the left hand, another set would be tracked by the right hand and the targets in another set of five targets would be tracked by both hands.

The invention has been described above with reference to preferred embodiments thereof. It will, however, be appreciated that variations in the apparatus and circuits will occur to those skilled in the art and may be incorporated without departing from the spirit or scope of the invention. Accordingly, it is appropriate that the claims be constructed broadly and in a manner consistent with the spirit and scope of the invention herein.

It is claimed:

1. Apparatus for determining at least one particular characteristic of a subject including:
   a. handle-operating means for moving a pointer;
   b. a plurality of positions for the pointer;
   c. an indicator pointer capable of assuming any one of a plurality of positions under control of said handle-operating means;
   d. said handle-operating means being capable of operation by said subject;
   e. a pair of cooperating toothed wheels, one wheel being mounted on the pointer and the other wheel being mounted on the handle-operating means whereby on rotation of the handle-operating means in one direction, then the pointer moves in the opposite direction;
   f. means for causing each of a plurality of stimulating events to occur in turn in a specified statistical distribution;
   g. each of said plurality of positions corresponding to a separate one of said events whereby on occurrence of a particular event, operation of said handle-operating means by the subject will cause the pointer to move towards or away from the corresponding position; and
   h. means for determining at least one response property of said subject whereby said particular characteristic can be determined.

2. Apparatus according to claim 1 including means for causing each of the stimulating events to occur only after said pointer has assumed that position corresponding to the immediately preceding event, and further means for recording the total time taken by the subject to complete a run.

3. Apparatus according to claim 1 including means for recording the number of times said pointer is caused to correctly assume one of said positions whereby an indication is available as to the number of positions not correctly assumed.

4. Apparatus according to claim 1 wherein said stimulating events comprise a plurality of illuminated lamps, each located at a different one of said positions, said pointer is provided with an integral movable target contact and a different one of a plurality of fixed target contacts is provided at different locations, each corresponding to a different one of said positions, whereby when said pointer assumes one of said positions, then the movable target contact is in electrical contact with the respective one of the fixed target contacts to complete an electrical circuit and thus operate an indicating device.

5. Apparatus according to claim 4 wherein one or more fixed error contacts are provided at each of said locations spaced from the respective fixed target contact and a movable error contact is provided on said pointer whereby, when said movable error contact is in contact with a respective fixed error contact, then an electrical circuit is completed to operate a further indicating device.

6. Apparatus for determining particular characteristics of a subject including:
   a. handle-operating means for moving a pointer;

b. a plurality of positions for the pointer;

c. an indicating pointer capable of assuming any one of a plurality of positions under control of said handle-operating means;

d. said handle-operating means being capable of operation by said subject;

e. a pair of cooperating toothed wheels, one wheel being mounted on the pointer and the other wheel being mounted on the handle-operating means whereby on rotation of the handle-operating means in one direction, then the pointer moves in the opposite direction;

f. means for causing each of a plurality of stimulating events to occur in turn in a specified statistical distribution;

g. each of said plurality of positions corresponding to a separate one of said events whereby on occurrence of a particular event, operation of said handle-operating means by the subject will cause the pointer to move towards or away from the corresponding position;

h. first means for measuring the accuracy of directional movement of the pointer produced by the subject;

i. second means for measuring the reaction time of the subject, said reaction time being the time between the occurrence of an event and movement of the pointer;

j. third means for determining the number of directional errors in the initial movement of said pointer for a plurality of events; and k. recording means for recording information supplied by said first, second and third means for subsequent analysis.

7. Apparatus according to claim 6 wherein said stimulating events comprise a plurality of illuminated lamps, each located at a different one of said positions, said pointer is provided with an integral movable target contact and a different one of a plurality of fixed target contacts is provided at different locations, each corresponding to a different one of said positions, whereby, when said pointer assumes one of said positions, then the movable target contact is in electrical contact with the respective one of the fixed target contacts to complete an electrical circuit and thus operate an indicating device.

8. Apparatus according to claim 7 wherein one or more fixed error contacts are provided at each of said locations spaced from the respective fixed target contact and a movable error contact is provided on said pointer whereby, when said movable error contact is in contact with a respective fixed error contact, then an electrical circuit is completed to operate a further indicating device.